United States Patent
Shefi (10) Patent No.: US 10,701,345 B2
(45) Date of Patent: Jun. 30, 2020

(54) SYSTEM AND METHOD FOR GENERATING A STEREO PAIR OF IMAGES OF VIRTUAL OBJECTS

(71) Applicant: Yoav Shefi, Tel Aviv (IL)

(72) Inventor: Yoav Shefi, Tel Aviv (IL)

(*) Notice: Subject to any disclaimer, the term of this patent is extended or adjusted under 35 U.S.C. 154(b) by 0 days.

(21) Appl. No.: 16/484,464

(22) PCT Filed: Feb. 8, 2017

(86) PCT No.: PCT/IL2017/050156
§ 371 (c)(1),
(2) Date: Aug. 8, 2019

(87) PCT Pub. No.: WO2018/146667
PCT Pub. Date: Aug. 16, 2018

(65) Prior Publication Data
US 2020/0036960 A1 Jan. 30, 2020

(51) Int. Cl.
*H04N 13/275* (2018.01)
*G06T 19/20* (2011.01)
*H04N 13/344* (2018.01)
*G06T 19/00* (2011.01)

(52) U.S. Cl.
CPC ......... *H04N 13/275* (2018.05); *G06T 19/006* (2013.01); *G06T 19/20* (2013.01); *H04N 13/344* (2018.05); *G06T 2210/12* (2013.01); *G06T 2219/2016* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

2007/0147671 A1 6/2007 Di Vencenzo et al.
2014/0267602 A1 9/2014 Tzur et al.

*Primary Examiner* — Todd Buttram (57) ABSTRACT

A method and system for generating a stereo pair of images of a 3D virtual space and presenting the images to a user. The system includes a display unit configured to displaying a stereo pair of images to the user and a processor for generating the stereo pair of images. The method of the invention, carried out by the processor includes positioning virtual scenes S1, ... Sn, ... SN in the virtual 3D space. The scenes are subjected to a first manipulation and then a left 2D image is obtained by projecting the space onto a viewing surface positioned in the 3D space. The scenes are then subjected to a second manipulation and the right 2D image is obtained by projecting the space onto the viewing surface.

21 Claims, 8 Drawing Sheets

SYSTEM AND METHOD FOR GENERATING A STEREO PAIR OF IMAGES OF VIRTUAL OBJECTS

RELATED APPLICATIONS

This application is a National Phase of PCT Patent Application No. PCT/IL2017/050156 filed on 8 Feb. 2017. The contents of the above applications are all incorporated by reference as if fully set forth herein in their entirety.

FIELD OF THE INVENTION

The present invention relates to systems and methods in augmented reality.

BACKGROUND OF THE INVENTION

In augmented reality (AR) virtual objects are integrated into images of a real-world scene. There are several considerations in the integration task for generating realistic 3D scenes suitable for stereoscopic viewing that combine 3D virtual objects with real-world objects:

Stereoscopic depth illusion consistency: A stereo pair of images of an object has to be obtained and displayed in a way that takes into account the distance of the object from the viewer and the inter-pupillary distance of the viewer so that the images coalesce in the brain and create a proper depth illusion. If the stereoscopic system uses parallel left and right lines-of-sight to obtain the images, the left and right lines of sight of the system must be separated by a distance corresponding to the inter-pupillary distance of the viewer, and the pair of images must be presented to the viewer separated by a distance corresponding to the inter-pupillary distance. If the left and right lines of sight meet at a finite point, the left and right lines of sight must intersect at an angle corresponding to the angular offset of the viewer's two eyes. In this case, the object cannot be positioned beyond the point of intersection of the two lines of sight, and the eyes cannot focus on objects in front of or beyond the intersection of the lines of sight.

Geometrical consistency: If the virtual object is freely moved in a real-world image, geometrically correct integration should be generated during the free motion. For example, the sizes of the virtual objects have to be correctly generated and the occlusion effects have to be correctly presented.

Motion consistency: If a virtual object is integrated into an image sequence, the motion of the virtual object should be consistent with that of the real-world objects contained in the scene images.

(3) Photometry consistency: The shadows of the virtual objects have to be correctly generated.

SUMMARY OF THE INVENTION

Glossary

As used herein, the term "scene" refers to a virtual scene comprising one or more virtual objects in a virtual 3D space.

Virtual objects in a collection of two or more virtual objects are said to share an associated common virtual plane if either:

there exists a plane in the 3D space and there exits three objects in the collection such that each of the three of the objects has at least one point of tangency with the plane;

or there exists a plane in the 3D space and there exist two objects in the collection, such that each of the two objects has at least one point of tangency with the plane and the two objects have together at least four points of tangency with the plane.

As used herein, the term "plane bound scene" refers to a virtual scene comprising two or more virtual objects having an associated common virtual plane, referred to herein as the "base plane", where no object included in the scene is elevated off the base plane more than the width dimension of the orthogonal projection of the scene's bounding box onto the base plane.

As used herein, the bounding box of a scene is the parallelepiped of minimal dimensions having faces parallel to the axes in the virtual space.

An internal axis of rotation of an object is an axis passing through the object. As a specific example, an axis of rotation may pass through the center of mass of the object.

In one of its aspects, the present invention provides a system for generating a stereo pair of images and displaying the stereo pair of images to a user. The system of the invention comprises display unit that may be, for example, in the form of a pair of goggles, glasses or headset to be worn over a user's eyes. The display unit includes a left display device for displaying to a user's left eye a left image of a stereo pair and a right display device for displaying to a user's right eye a right image of a stereo pair. The system provides a processor configured to generate a stereo pair of images of a virtual 3D space and to display the stereo pair on the display unit. The processor may also be configured to integrate the stereo pair of images with real-world images of the user's environment.

In another of its aspects, the invention provides a method for generating a stereo pair of images that would be carried out by the processor of the system of the invention. In accordance with this aspect of the invention, a number of scenes S1, ... Sn, ... SN are positioned in a virtual 3D space. Each of the scenes S1, ... Sn, ... SN has a first associated predetermined point of rotation An. A 2D viewing surface is positioned in the virtual 3D space parallel to the y axis and orthogonal to the z axis, and a viewing ray is positioned in the virtual space normal to the viewing surface. The viewing surface and the viewing ray determine a perspective projection of the 3D space onto the viewing surface.

Each of the scenes Sn in the virtual 3D space is rotated about an axis passing through the predetermined point An through a predetermined angle $\theta n$, where $\theta n > 0$ for at least one n. The rotation of Sn in the virtual 3D space is counter-clockwise when viewed from above (i.e. from a point along the axis of rotation viewed towards the x-z plane in the negative y direction). After rotation of the scenes Sn about An, each scene Sn may optionally be rotated about an axis of rotation passing though a predetermined point Bn and parallel to the z axis, through an angle $-\varphi$, where $\varphi$ is the current angle between the up-vector of the display unit and the gravitational field, After these rotations, the left 2D image of the virtual space is obtained on the 2D viewing surface by the perspective projection determined by the viewing surface and the viewing ray.

The scenes Sn are then returned to their original location and orientation prior to the rotations. Each of the scenes Sn in is then rotated about the axis passing through the point An through the predetermined angle $-\theta n$. The rotation of Sn in this case is thus clockwise when viewed from a point along the axis passing through the point An viewed towards the x-z plane).

After rotation of the scenes Sn about the point An, each scene Sn may optionally be rotated about the axis passing though Bn through the angle −cp, where cp is again the current angle between the up-vector of the display unit and the gravitational field, as determined by the gravitational field detector and input to the processor.

After the last rotations, a right 2D image of the virtual space is obtained on the 2D viewing surface by the perspective projection determined by the viewing surface and the viewing ray. The processor can then display the left 2D image on the left display surface the right 2D image on the right display surface of the system of the invention. The left 2D image is thus presented to the left eye of a user, and simultaneously the right 2D image is presented to the right eye.

The process may be repeated any number of times m succession, to create a video stream of stereo pairs of images.

Thus, in one of its aspects, the present invention provides a method for generating a stereo pair of images, of one or more scenes, the stereo pair comprising a 2D left view image and a 2D right view image the method comprising:
  (a) generating a virtual 3D space having an x-axis, a y-axis and a z-axis, the x-axis, the y-axis and the z-axis being mutually orthogonal;
  (b) positioning a collection of an integer N1 of scenes S1, ... Sn, ... SN in the virtual 3D space, each of the scenes S1, ... Sn, ... SN having a first associated predetermined point of rotation An;
  (c) positioning a 2D viewing surface and a viewing ray having vertex or viewpoint in the virtual space, the viewing surface being positioned in the virtual 3D space parallel to the y axis and orthogonal to the z axis, the viewing ray being normal to the viewing surface and the viewing surface and the viewing ray determining a perspective projection of the 3D space onto the viewing surface;
  (d) rotating each of the scenes Sn in the virtual 3D space about an axis of rotation passing through the predetermined point An, the rotation being through a predetermined angle 8n, where 8n>O for at least one n, and the rotation of Sn in the virtual 3D space being counterclockwise when viewed from a point on the axis of rotation viewed towards the x-z plane and in the negative y direction;
  (e) obtaining a left 2D image of the virtual space on the 2D viewing surface by the perspective projection determined by the viewing surface and the viewing ray;
  (f) returning each scene Sn its location and orientation that the scene had prior to the rotation of step (d);
  (g) rotating each of the scenes Sn in the virtual 3D space about the axis passing through the point An, the rotation being through an angle −8n, where 8n is the predetermined angle 8n for at least one n, the rotation of Sn in the virtual 3D space being clockwise when viewed from a point along the axis passing through the point An viewed towards the x-z plane; and
  (h) obtaining the right 2D image of the virtual space on the 2D viewing surface by the perspective projection determined by the viewing surface and the viewing ray.

In the method of the invention, for one or more of the scenes Sn, the point An may satisfy one or more of the following conditions:
  (a) the axis of rotation about the point An does not lie on an axis of radial symmetry of any objects included in the scene Sn;
  (b) the axis of rotation about the point An is perpendicular to a vector which is parallel to the z axis which also intersects a bounding box of the scene Sn, and the axis of rotation about the point An intersects the vector;
  (c) the scene Sn lies between An and the viewing surface;
  (d) The axis about the point An intersects a line parallel to the z axis and passing though a center of gravity of a bounding box of Sn; and
  (e) An is positioned at a point along a line parallel to the z-axis between Sn and a perceived location of a real world object.

At least one of the scenes Sn may be a plane bound scene Sn having a base plane, and the angle 8n depends on an angle between the view ray and the base plane.

After the rotation of the scenes Sn about the axis passing through the point An, one or more of the scenes Sn may be translated a distance do in a first direction that is parallel to the viewing surface.

Each of the scenes S1, ... Sn, ... SN may have a second associated predetermined point of rotation Bn, in which case the method may further comprise a step of rotating each scene about an axis of rotation passing through the point Bn parallel to the z axis, through an angle −cp, wherein cp is an angle between an up-vector and a gravitational field.
  (a) One or more of the points Bn may satisfy one or more of the following properties: a line passing through Bn parallel to the y axis also passes through a center of a bounding box of the scene Sn; and
  (b) Bn lies on a line lying on a plane bisecting a top and bottom of the bounding box. After rotation about the axis about the axis through Brr one or more of the objects in any one or more of the scenes Sn may then be rotated individually by an angle −8n about an internal axis of the object that is parallel to the y axis. One or more of the scenes sn may be translated a distance d,n in a first direction that is parallel to the viewing surface.

At least one of the scenes Sn is a plane bound scene having a base plane and the axis of rotation through the point An is perpendicular to the base plane.

The method may be repeated any number of times in succession to create a video stream of stereo pairs of images. For one or more occurrences of the method, any one or more of the following may be changed:
  (a) one or more of the rotation angles 8n;
  (b) one or more of the An; and
  (c) one or more of the Bn.

In another of its aspects, the invention provides a system for generating a stereo pair of images of one or more scenes, the stereo pair comprising a 2D left view image and a 2D right view image, and resenting the stereo pair to a user, the system comprising:
  (a) a display unit having a left display device for displaying to a user's left eye a left image of a stereo pair and further having a right display device for displaying to a user's right eye a right image of a stereo pair, the display unit having an associated up vector that is fixed relative to the display unit;
  (b) a processor configured to execute a method for generating the stereo pair of images of one or more scenes, the method comprising:
    generating a virtual 3D space having an x-axis, a y-axis and a z-axis, the x-axis, the y-axis and the z-axis being mutually orthogonal;
    positioning a collection of an integer N2:=:) of scenes $S_1$, ... Sn, ... SN in the virtual 3D space, each of the scenes $S_1, \ldots S_n, \ldots SN$ having a first associated predetermined point of rotation $A_n$;

positioning a 2D viewing surface and a viewing ray having vertex or viewpoint in the virtual space, the viewing surface being positioned in the virtual 3D space parallel to the y axis and orthogonal to the z axis, the viewing ray being normal to the viewing surface, and the viewing surface and the viewing ray determining a perspective projection of the 3D space onto the viewing surface;

rotating each of the scenes Sn in the virtual 3D space about an axis of rotation passing through the predetermined point $A_n$, the rotation being through a predetermined angle $8_n$, where $8_n>0$ for at least one n, and the rotation of Sn in the virtual 3D space being counter-clockwise when viewed from a point on the axis of rotation viewed towards the x-z plane and in the negative y direction;

obtaining a left 2D image of the virtual space on the 2D viewing surface by the perspective projection determined by the viewing surface and the viewing ray;

returning each scene Sn to its location and orientation that the scene had prior to the rotation of step (d);

rotating each of the scenes Sn in the virtual 3D space about the axis passing through the point $A_n$, the rotation being through an angle $-8_n$, where $8_n$ is the predetermined angle $8_n$ for at least one n, the rotation of Sn in the virtual 3D space being clockwise when viewed from a point along the axis passing through the point $A_n$ viewed towards the x-z plane;

obtaining the right 2D image of the virtual space on the 2D viewing surface by the perspective projection determined by the viewing surface and the viewing ray; and displaying the left 2D image on the left display surface and displaying the right 2D image on the right display surface.

The system of the invention may comprise one or more sensors configured to obtain data on a real-world environment around the user. The one or more sensors may include, for example, a gravitational field detector that generates a time-dependent data signal that is indicative of an angle cp between a direction of the gravitational field and the up vector of the display unit, the signal being input to the processor.

Each of the scenes $S1, \ldots Sn, \ldots SN$ may have a second associated predetermined point of rotation $B_n$, and the processor is further configured to rotate each scene about an axis of rotation passing through the point $B_n$ parallel to the z axis, through an angle cp, wherein cp is the angle between an up-vector and a gravitational field.

At least one of the scenes Sn may be a plane bound scene having a base plane and the axis through $A_n$ is perpendicular to the base plane.

display unit may be in the form of a pair of goggles, glasses or headset to be worn over a user's eyes. One or more of the display devices may comprise a transparent or translucent surface upon which images are projected.

One or more of the sensors include one or more video cameras that obtain images of a real-world environment of the user.

The processor may be further configured to integrate the stereo pair of images with real-world images of the user's environment.

The value of any one or more of the $8_n$, $A_n$ or $B_n$ may depend on data input to the processor from any one of the sensors.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DESCRIPTION OF THE INVENTION

Figure 1:
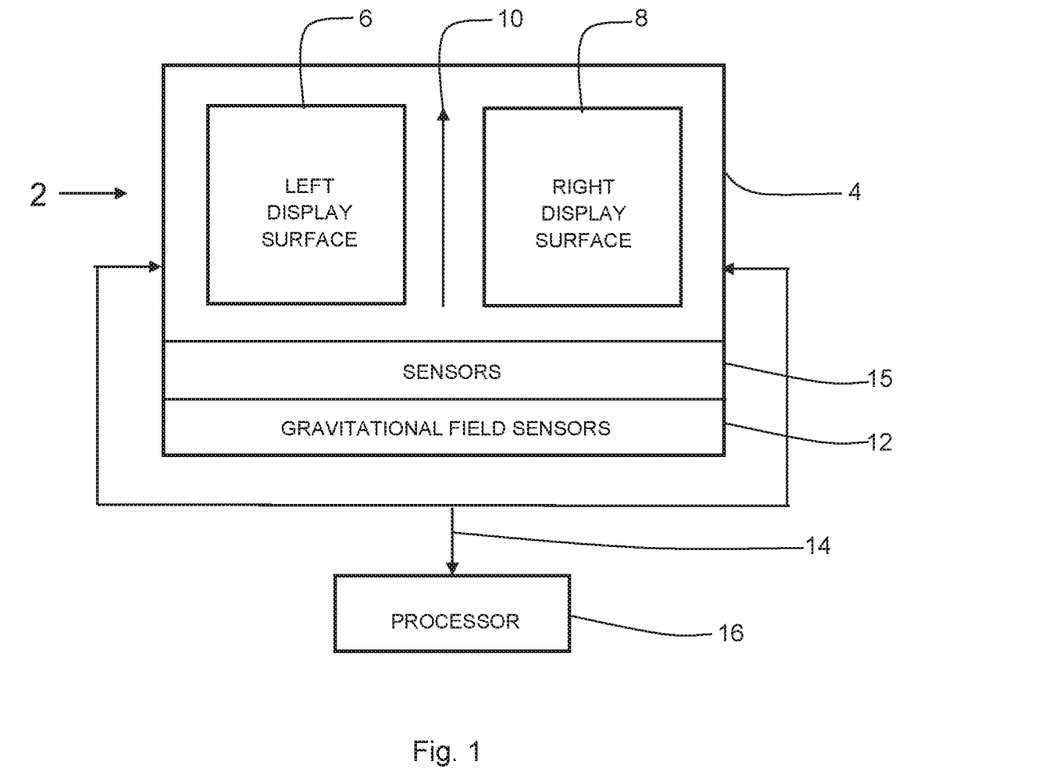
FIG. 1 shows schematically a system for displaying a stereo pair of 2D images in accordance with one embodiment of the invention.

FIG. 1 shows schematically a system 2 for generating a stereo pair of images and displaying the stereo pair of images to a user, in accordance with one embodiment of this aspect of the invention. The system 2 comprises display unit 4 that may be, for example, in the form of a pair of goggles, glasses or headset to be worn over a user's eyes. The display unit 4 comprises a left display device 6 for displaying to a user's left eye a left image of a stereo pair and a right display device 8 for displaying to a user's right eye a right image of a stereo pair. The display devices 6 and 8 may comprise, for example, a transparent or translucent surface upon which the left and right images, respectively, are projected. The display unit 4 has an associated up vector 10 that is fixed relative to the display unit 4.

The system 2 may also comprise one or more sensors 15 configured to obtain data on the real-world environment around the user and manual actions performed by the user. The sensors may be, for example, one or more video cameras that obtain images of the real-world environment of the user. The sensors may also include a gravitational field detector 12. The gravitational detector 12 may be integral with the display unit 4 and generates a time-dependent data signal 14 that is indicative of an angle between the direction of the gravitational field and the up vector 10 of the display unit 4. The signal 14 is continuously or periodically input to a processor 16.

The processor 16 is configured to generate a stereo pair of images of a virtual 3D space. The processor 16 may also be configured to integrate the stereo pair of images with real-world images of the user's environment.

Figure 2:
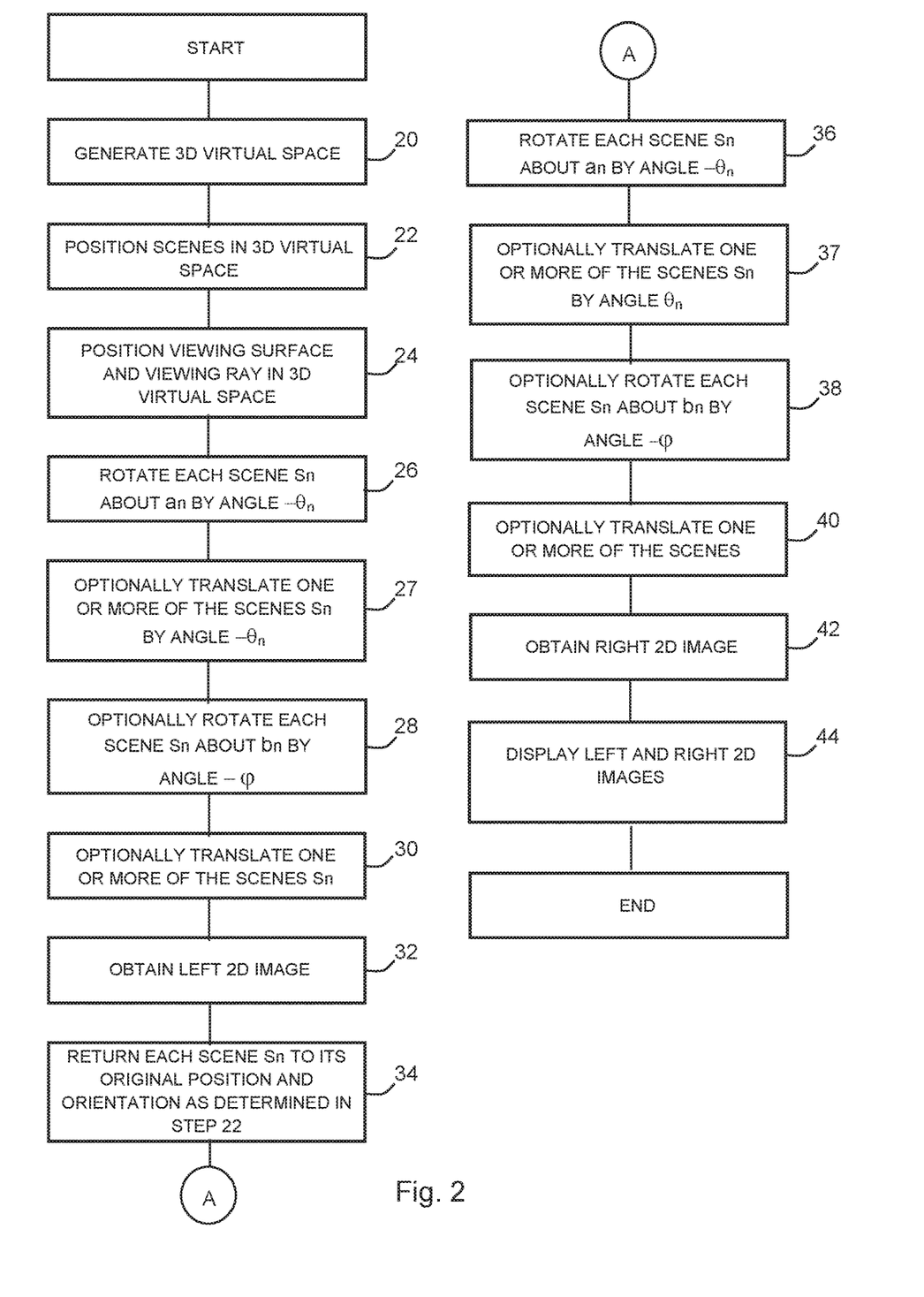
FIG. 2 shows a flow chart for a method for generating a stereo pair of images of one or more virtual objects or scenes in accordance with one embodiment of the invention.

FIG. 2 shows a flow chart for a method for generating a stereo pair of images, in accordance with one embodiment of this aspect of the invention. The method of FIG. 2 is depicted in FIG. 3.

Figure 3A:
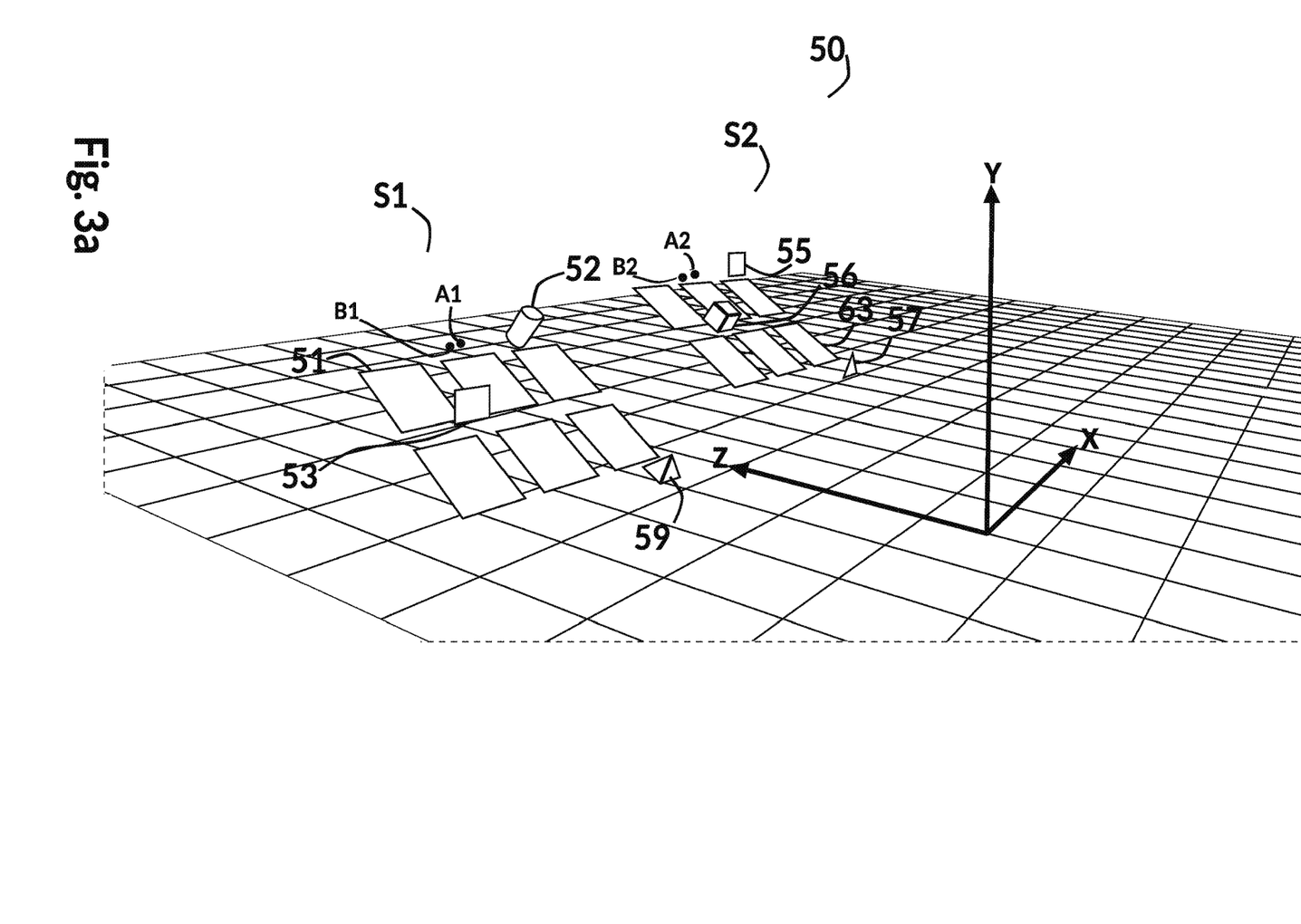
FIG. 3a shows a virtual 3D space having an x-axis, a y-axis and a z-axis that are mutually orthogonal.

In step 20, a virtual 3D space 50 is generated having an x-axis, a y-axis and a z-axis that are mutually orthogonal (FIG. 3a).

Next, in step 22, a collection of an integer N2:=:) of scenes $S_1, \ldots Sn, \ldots SN$ are positioned in the virtual 3D space 50. For clarity, two scenes $S_1$ and $S_2$ are shown in FIG. 3a. This is by way of example only, and the invention may be carried out with any number of scenes. Each of the scenes $S_0$ comprises one or more virtual objects. Thus, for example, in FIG. 3a, the scene $S_1$ comprises virtual objects 52, 53, and 59 and several pages 51 lying in a common plane, while the scene $S_2$ comprises virtual objects 55, 56 and 57, and several pages 63 lying in a common plane. A scene Sn may thus include one or more planar objects such as a page, in which case the scene is a plane bound scene. Each of the scenes $S_1, \ldots Sn, \ldots SN$ has a first associated predetermined point of rotation An, and optionally a second predetermined point of rotation Bn.

Figure 3B:
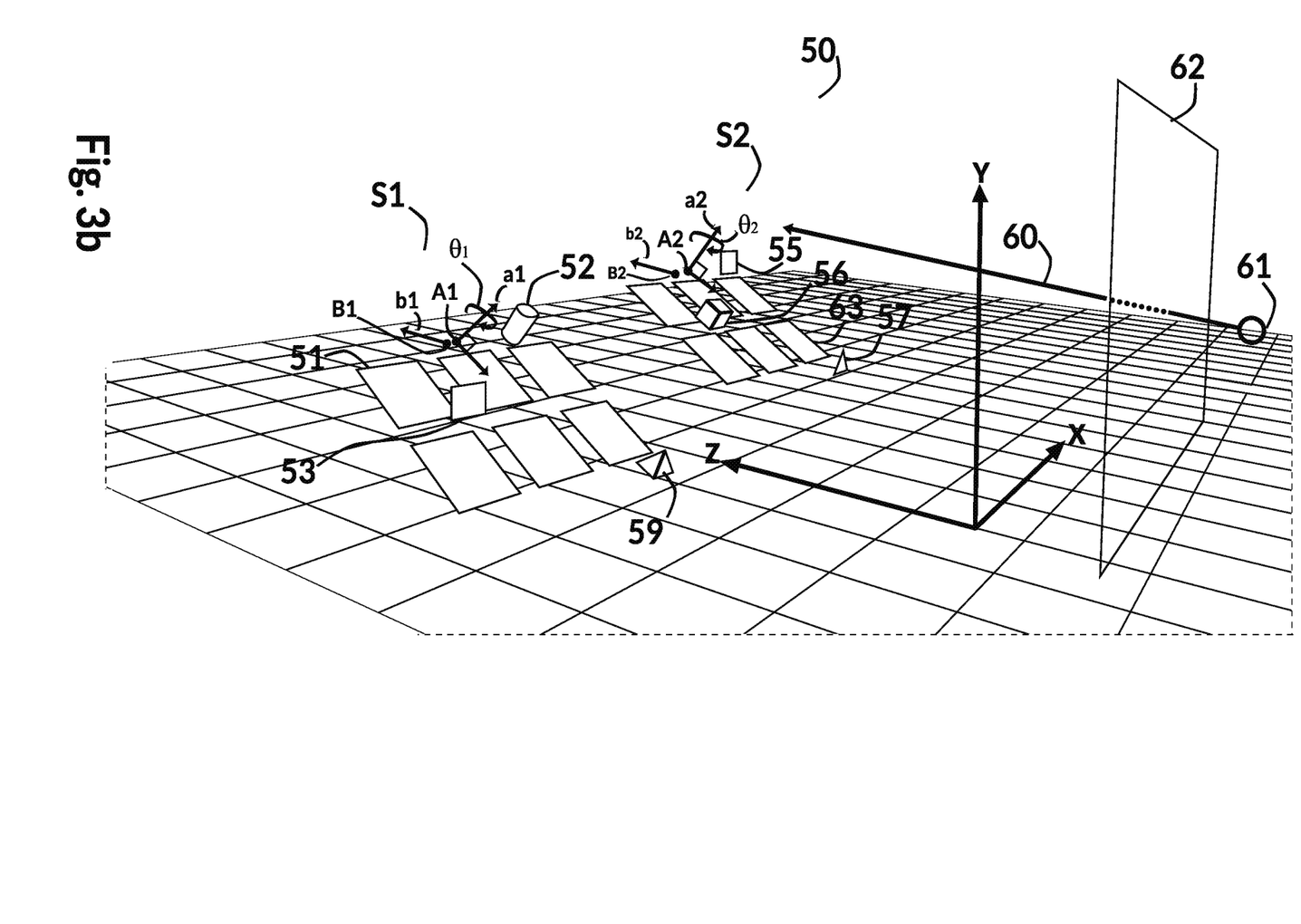
FIG. 3b shows the 3D space after positioning a 2D viewing surface and a viewing ray.

In step 24, a 2D viewing surface 62 and a viewing ray 60 having vertex 61, referred to herein as "the viewpoint" are positioned in the virtual space (FIG. 3b). The viewing surface 62 is positioned in the virtual 3D space 50 parallel to the y axis and orthogonal to the z axis. The view ray 60 is normal to the viewing surface 62. The viewing surface 62 and the viewing ray 60 determine a perspective projection of the 3D space onto the viewing surface.

In step 26, as indicated in FIG. 3b, each of the scenes Sn in the virtual 3D space is rotated about an axis an passing through the predetermined point An through a predetermined angle 8n, where 8n>O for at least one n. The axis an may be parallel to the y axis. For a plane bound scene, the axis an may be perpendicular to the base plane. The rotation of Sn in the virtual 3D space is counter-clockwise when viewed from above (i.e. from a point along the axis an viewed towards the x-z plane in the negative y direction, or towards the An). For a plane bound scene Sn, the angle 8n may be defined by a functional dependency of the angle between the view ray and the base plane either through a predetermined functional dependence or as a function of additional input data from the user or the physical environment. For example, 8n can depend on the angle formed between the base plane of the scene Sn and the viewing ray.

The point An may be selected so that the axis of rotation an does not lie on an axis of radial symmetry of any objects included in the scene Sn. An may be selected so that an is perpendicular to, and intersects, a vector which is parallel to the z axis which also intersects some bounding box of the scene Sn. In particular, the point An may be positioned so that the scene Sn lies between An and the viewing surface. an may intersect a line parallel to the z axis and passing though the center of gravity of a bounding box of Sn. For a plane bound scene, an may be perpendicular to the base plane of the scene. When a scene Sn is to be displayed in the stereo pair so as to appear between a user's viewpoint and a real world physical object, An can be positioned, for example, at a point along a line parallel to the z-axis between Sn and the perceived location of the real world object.

Figure 3C:
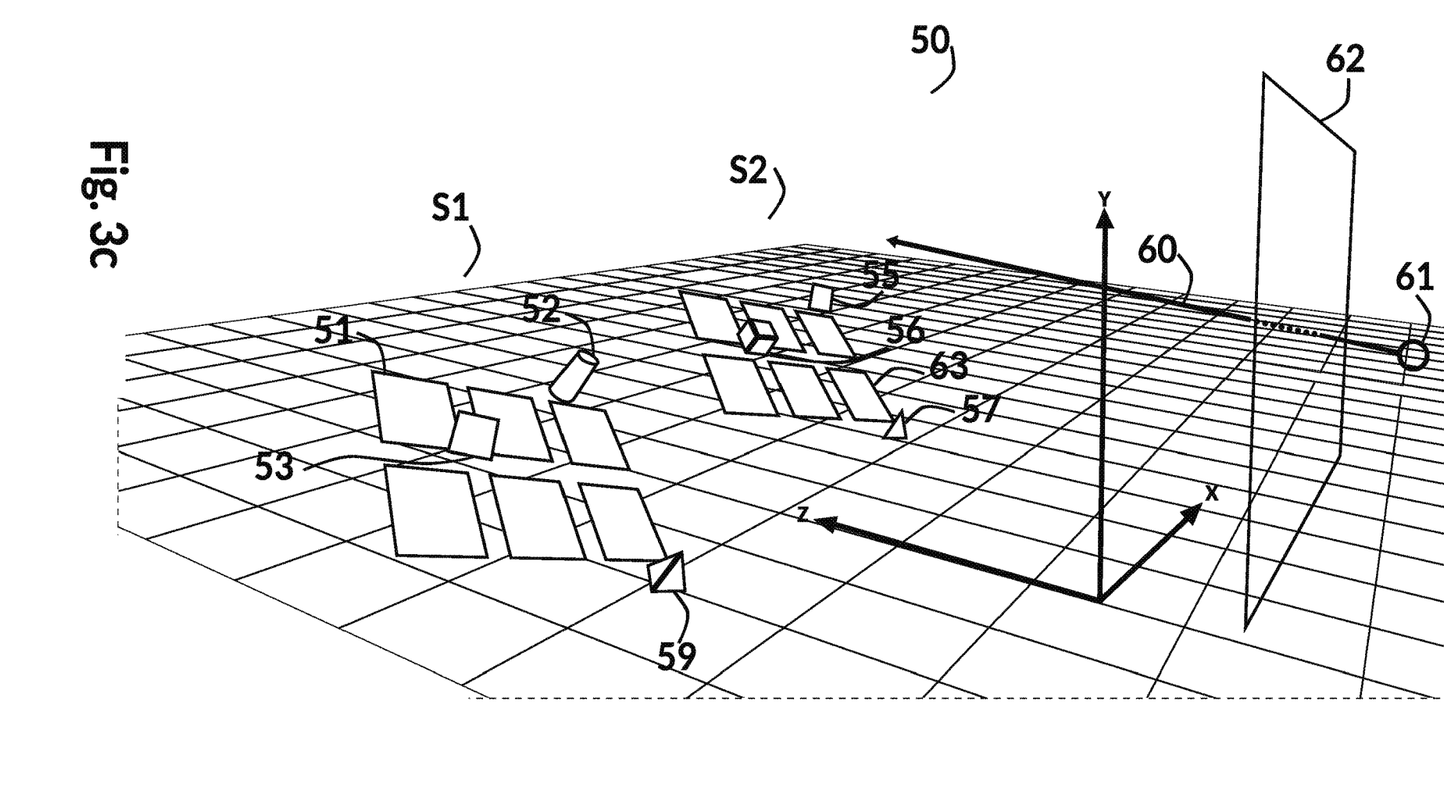
FIG. 3c shows the 3D virtual space 50 after rotation of the scenes $S_1$ and $S_2$ counter-clockwise through an angle $8_1$ and $8_2$, respectively, about the axes of rotation $a_1$ and $a_2$ respectively.

FIG. 3c shows the 3D virtual space 50 after rotation of the scenes $S_1$ and $S_2$ counter-clockwise through an angle $8_1$ and $8_2$, respectively, about the axes of rotation $a_1$ and $a_2$ respectively.

In step 27, one or more of the objects in any one or more of the scenes Sn may be rotated individually by an angle −8n about an internal axis of the object that is parallel to the y axis. Objects that are rotated in this way will thus have the same orientation as the object had prior to the rotation of the scene.

After rotation of the scenes Sn about the an, m step 28, each scene Sn may optionally be rotated about an axis of rotation bn passing though the point Bn and parallel to the z axis, through an angle −cp, where cp is the current angle between the up-vector 10 of the display unit 4 and the gravitational field, as determined by the gravitational field detector 12 and input to the processor 16 in the signal 14. The point Bn may be selected, for example, so that a line passing through Bn parallel to the y axis also passes through a center of a bounding box of the scene Sn. Alternatively, Bn may lie on a line on the plane bisecting the top and bottom of the bounding box. After the rotation of the scenes Sn in the virtual 3D space, one or more of the scenes Sn may optionally be translated a distance do in a first direction that is parallel to the viewing surface 62 (step 30). This might be necessary if, after the rotations, a part of one or more scenes will not be projected onto the viewing surface, as explained below, in order to ensure that the entire scene will be projected onto the viewing surface 62.

Figure 3D:
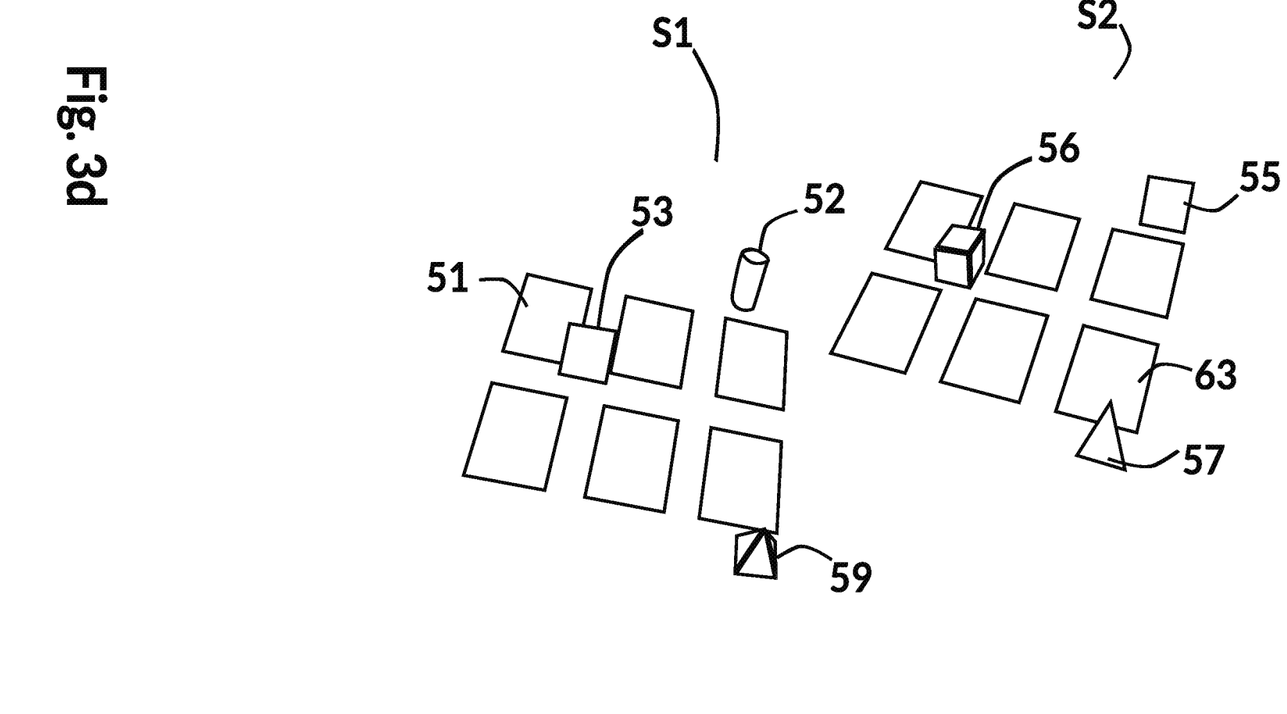
FIG. 3d shows the left 2D image of the virtual 3D space obtained on the configuration shown in FIG. 3c by the perspective projection determined by the viewing ray and the viewing surface.

In step 32, a left 2D image of the virtual space is obtained on the 2D viewing surface by the perspective projection determined by the viewing surface and the viewing ray. FIG. 3d shows the left 2D image 64 of the virtual 3D space 50 in the configuration shown in FIG. 3c by the perspective projection determined by the viewing ray 60 and the viewing surface 62.

In step 34, each scene Sn is returned to its original location and orientation of the scene, as determined in step 22 (FIGS. 3a and 3b). This may be accomplished either by recalling from a memory the position and orientation of the scenes determined in Step 22 or by applying to each scene Sn the transformations that are inverse to the transformations that were applied to the scenes in steps 26, 28, and 30.

In step 36, each of the scenes Sn in the virtual 3D space is rotated about the axis an through the predetermined angle −8n, where 8n>O for at least one n. The rotation of Sn in the virtual 3D space is thus clockwise when viewed from a point along the axis passing through the point An viewed towards the x-z plane).

Figure 3E:
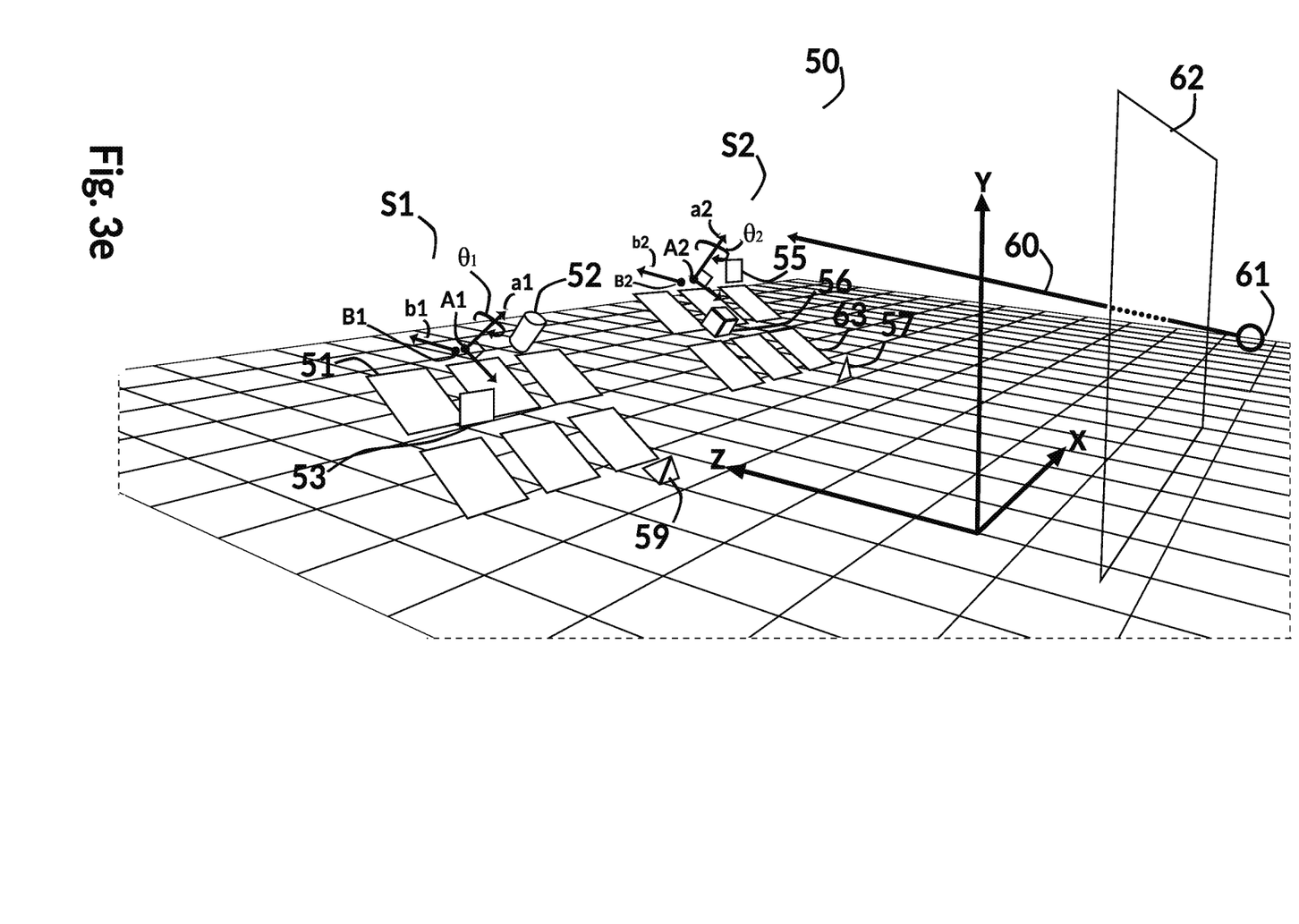
FIG. 3e shows the 3D virtual space after rotation of the scenes $S_1$ and $S_2$ clockwise through an angle $-81$ and $-82$, respectively, about the vector of rotation $a1$ and $a_2$ respectively.

FIG. 3e shows the 3D virtual space 50 after rotation of the scenes S1 and S2 clockwise through an angle $-8_1$ and $-8_2$, respectively, about the vector of rotation $a_1$ and $a_2$ respectively.

In step 37, one or more of the objects in any one or more of the scenes Sn may be rotated individually by and angle −8n about an internal axis of the object parallel to the y axis. Objects that are rotated in this way will thus have the same orientation as the object had prior to the rotation of the scene.

After rotation of the scenes Sn about the Axis an, in step 38, each scene Sn may optionally be rotated about the axis bn through the angle −cp, where cp is the current angle between the up-vector 10 of the display unit 4 and the gravitational field, as determined by the gravitational field detector 12 and input to the processor 16 in the signal 14.

After the rotations in the virtual 3D space in steps 36, 37 and 38, one or more of the scenes Sn may optionally be translated a distance d'n in a first direction that is parallel to the viewing surface 62 (step 40). This might be necessary if, after the rotations, a part of one or more scenes will not be projected onto the viewing surface, as explained below, in order to ensure that the entire scene will be projected onto the viewing surface 62.

Figure 3F:
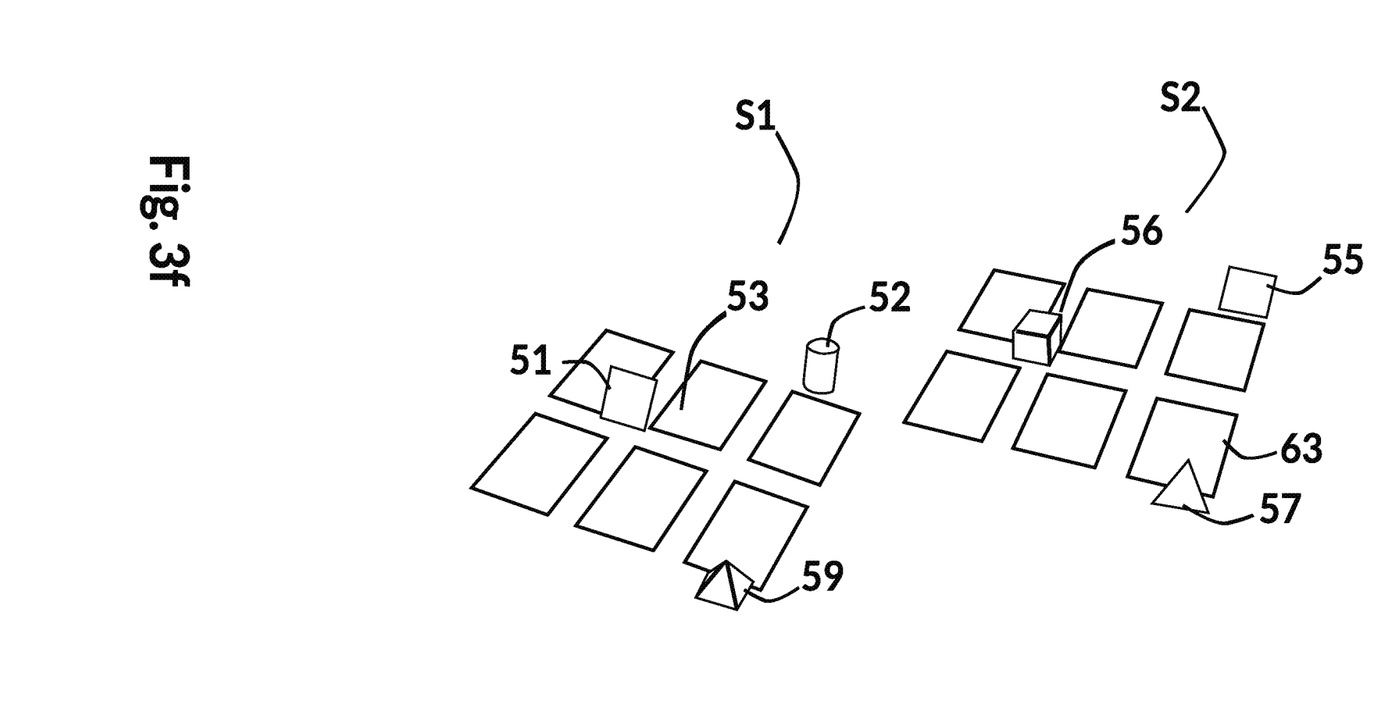
FIG. 3f shows the right 2D image of the virtual 3D space obtained on the configuration shown in FIG. 3e by the perspective projection determined by the viewing ray and the viewing surface.

In step 42, a right 2D image of the virtual space is obtained on the 2D viewing surface by the perspective projection determined by the viewing surface and the viewing ray. FIG. 3*f* shows the right 2D image 66 of the virtual 3D space 50 in the configuration shown in FIG. 2*h* by the perspective projection determined by the viewing ray 60 and the viewing ray 62.

In step 44, the processor displays the left 2D image 64 on the left display surface 6 and displays the right 2D image 66 on the right display surface 8. The left 2D image is thus presented to the left eye of a user, and simultaneously the right 2D image is presented to the right eye. The process then terminates.

The process may be repeated any number of times in succession, to create a video stream of stereo pairs of images. For each occurrence of the process, one or more of the rotation angles 8n may be changed or one or more of An or Bn may be changed. The value of any one or more of the 8n, $A_0$ or $B_0$ may depend on data input to the processor 16 from any one of the sensors 15.

The inventor has found that use of the method of the invention to generate a pair of stereo images produces unexpected visual effects when the images are viewed as a stereo pair, especially when the stereo pair is combined with a real-world scene, as in augmented reality. In the case of plane bound scenes, for example, in viewing a pair of left and right 2D images generated in accordance with the invention as a stereo pair, a satisfactory resolution of ambiguity arising from the perspective projection can be obtained. A satisfactory estimation of height and depth distances can also be obtained without auxiliary cues. Furthermore, simultaneous multiple depth fields have been observed even in the absence of overall stereoscopic displacement consistency. This is especially critical for augmented reality. This facilitates accurate manual manipulation of small virtual content items without confusing them with content items which are close to each other or overlapping when viewed along the view ray. Furthermore, positioning of planar content items, such as documents, images and video surfaces, in a plane bound scene tends to facilitate accurate manipulation of the planar content items in the virtual 3D dimensional space, and tends to make the planar content items to appear as accurately positioned in real space relative to the real environment and real objects therein.

These effects have been observed without prior knowledge of the physical environment, and without the need to adapt the separation of the left and right display surfaces to the inter-pupillary distance of the user as is often required in prior art stereoscopic rendition methods.

The inventor has also observed that, in augmented reality, when the stereo pair includes two or more clusters of virtual content that are to be attached to two or more real world physical objects at varying distances from the user, each cluster tends to have its own 3D stereo effect even in the presence of size discrepancies. For instance, a virtual scene can be attached to a physical real world object 30 meters away while another virtual scene virtual is attached to a real world object a meter away even when the relative sizes of comparable virtual objects in the two scenes are not consistent with the relative distances between the user and the real world objects. This facilitates manual manipulation of small virtual content items without confusing them with content items that are attached to closer objects and where both scenes include relatively large objects.

Stereo pairs of images produced by the method of the invention of a plane bound scene can create unexpected effects. For example, a plane bound scene which has been geometrically tilted relative to the view ray can appear to be an untilted relative to the user's view. Furthermore, such a scene tends to consistently appear to be viewed from above the base plane of the scene, regardless of how high the scene is positioned in the user's field of view.

When stereo pairs of images produced by the method of the invention of one or more plane bound scenes are made to appear with their base plane in the plane of a real-world flat object, such as a flat screen, the scenes tend to appear to extend the flat object. and provide a relatively accurate depth sensation when interacting with the flat object and the virtual content as extensions of each other. In this way, the flat real-world object appears to be part of the plane bound scene. This effect can be achieved by varying the 8n according to the tilt angle between the flat object and the view ray. When the tilt angel is close to O or 90°, the 8n should be close to 0°. When the tilt angle is intermediate between O and 90° 0, the 8n should be maximal.

The notoriously small mobile screens may thus be virtually extended allowing simultaneous viewing of a larger amount of content elements positioned in a plane bound scene organization. Thus, the base plane of the plane bound scene may be perceived as a continuation of the mobile screen surface, as the mobile screen is rotated by the user in relative to the display view ray It should be remembered that the above features are not observed in an abstract virtual space but in the user's mind. In augmented reality, where virtual objects are intermixed with real-world objects, what the user perceives should be consistent with how the user sees the physical environment. If the user's perception of the environment is not consistent with the user's perception of the virtual content, the user will be forced to constantly switch visually between the virtual scene and the real world environment. This can easily cause cognitive fatigue and even a safety risk in cases of using augmented reality while driving or running. On the other hand, accurately mapping of every environment in order to eliminate spatial discrepancies in the virtual reality, is computationally impractical.

The method of the present invention allows converting any see through screen glasses into a hologram which integrates into the environment quite naturally. This enables local perception of scenes composed of multiple flat and volumetric items, bringing to the user live web and database documentary content sets that offer multiple choices suited to every situation such as driving by an object of interest. Presenting multiple content sets in a local independent but relatively accurate depth sensation allows the user to feel that the content objects are 'really there' and to relate them confidently to his hands and the environment.

The invention claimed is:

1. A method for generating a stereo pair of images, of one or more scenes, the stereo pair comprising a 2D left view image and a 2D right view image the method comprising:
   (a) generating a virtual 3D space having an x-axis, a y-axis and a z-axis, the x-axis, the y-axis and the z-axis being mutually orthogonal;
   (b) positioning a collection of an integer N1 of scenes $S_1, \ldots S_n, \ldots SN$ in the virtual 3D space, each of the scenes $S_1, \ldots S_n, \ldots SN$ having a first associated predetermined point of rotation An;
   (c) a 2D viewing surface and a viewing ray having vertex or viewpoint in the virtual space, the viewing surface being positioned in the virtual 3D space parallel to the y axis and orthogonal to the z axis, the viewing ray being normal to the viewing surface and the viewing surface and the viewing ray determining a perspective projection of the 3D space onto the viewing surface;

(d) rotating each of the scenes Sn in the virtual 3D space about an axis of rotation passing through the predetermined point An, the rotation being through a predetermined angle 8n, where 8n>O for at least one n, and the rotation of Sn in the virtual 3D space being counter-clockwise when viewed from a point on the axis of rotation viewed towards the x-z plane and in the negative y direction;

(e) obtaining a left 2D image of the virtual space on the 2D viewing surface by the perspective projection determined by the viewing surface and the viewing ray;

(f) returning each scene Sn its location and orientation that the scene had prior to the rotation of step (d);

(g) rotating each of the scenes Sn in the virtual 3D space about the axis passing through the point An, the rotation being through an angle −8n, where 8n is the predetermined angle 8n for at least one n, the rotation of Sn in the virtual 3D space being clockwise when viewed from a point along the axis passing through the point An viewed towards the x-z plane; and (h) obtaining the right 2D image of the virtual space on the 2D viewing surface by the perspective projection determined by the viewing surface and the viewing ray.

2. The method according to claim 1 wherein for one or more of the scenes Sn, the point An satisfies one or more of the following conditions:

(a) the axis of rotation about the point An does not lie on an axis of radial symmetry of any objects included in the scene Sn;

(b) the axis of rotation about the point An is perpendicular to a vector which is parallel to the z axis which also intersects a bounding box of the scene Sn, and the axis of rotation about the point An intersects the vector;

(c) the scene Sn lies between An and the viewing surface;

(d) The axis about the point An intersects a line parallel to the z axis and passing though a center of gravity of a bounding box of Sn; and (e) An is positioned at a point along a line parallel to the z-axis between Sn and a perceived location of a real world object.

3. The method according to claim 1 wherein at least one of the scenes Sn is a plane bound scene Sn having a base plane, and the angle 8n depends on an angle between the view ray and the base plane.

4. The method according to claim 1 wherein, after the rotation of the scenes Sn about the axis passing through the point An, one or more of the scenes Sn is translated a distance dn in a first direction that is parallel to the viewing surface.

5. The method according to claim 1 wherein each of the scenes S1, ... Sn, ... SN has a second associated predetermined point of rotation Bn, and the method further comprises a step of rotating each scene about an axis of rotation passing through the point Bn parallel to the z axis, through an angle −cp, wherein cp is an angle between an up-vector and a gravitational field.

6. The method according to claim 5 wherein one or more of the points Bn satisfy one or more of the following properties:

(a) a line passing through Bn parallel to the y axis also passes through a center of a bounding box of the scene Sn; and (b) Bn lies on a line lying on a plane bisecting a top and bottom of the bounding box.

7. The method according to claim 5 wherein after rotation about the axis about the axis through Bn one or more of the objects in any one or more of the scenes Sn is rotated individually by an angle −8n about an internal axis of the object that is parallel to the axis an.

8. The method according to any one of claims 5 wherein, after the rotation of the scenes in the virtual 3D space about the axis through the point Bn, one or more of the scenes Sn is translated a distance d'n in a first direction that is parallel to the viewing surface.

9. The method according to claim 1 wherein at least one of the scenes Sn is a plane bound scene having a base plane and the axis $a_0$ is perpendicular to the base plane of the scene.

10. The method according to claim 1 wherein the method is repeated any number of times in succession to create a video stream of stereo pairs of images.

11. The method according to claim 10 wherein, for one or more occurrences of the method, any one or more of the following are changed:

(a), one or more of the rotation angles 8n;

(b) one or more of the An; and (c) one or more of the Bn.

12. A system for generating a stereo pair of images of one or more scenes, the stereo pair comprising a 2D left view image and a 2D right view image, and resenting the stereo pair to a user, the system comprising:

(a) a display unit having a left display device for displaying to a user's left eye a left image of a stereo pair and further having a right display device for displaying to a user's right eye a right image of a stereo pair, the display unit having an associated up vector that is fixed relative to the display unit; and (b) a processor configured to execute a method for generating the stereo pair of images of one or more scenes, the method comprising:

generating a virtual 3D space having an x-axis, a y-axis and a z-axis, the x-axis, the y-axis and the z-axis being mutually orthogonal;

positioning a collection of an integer N1 of scenes S1, ... Sn, ... SN in the virtual 3D space, each of the scenes S1, ... Sn, ... SN having a first associated predetermined point of rotation An;

positioning a 2D viewing surface and a viewing ray having vertex or viewpoint in the virtual space, the viewing surface being positioned in the virtual 3D space parallel to the y axis and orthogonal to the z axis, the viewing ray being normal to the viewing surface, and the viewing surface and the viewing ray determining a perspective projection of the 3D space onto the viewing surface;

rotating each of the scenes Sn in the virtual 3D space about an axis of rotation passing through the predetermined point An, the rotation being through a predetermined angle 8n, where 8n>O for at least one n, and the rotation of Sn in the virtual 3D space being counter-clockwise when viewed from a point on the axis of rotation viewed towards the x-z plane and in the negative y direction;

obtaining a left 2D image of the virtual space on the 2D viewing surface by the perspective projection determined by the viewing surface and the viewing ray;

returning each scene Sn to its location and orientation that the scene had prior to the rotation of step (d);

rotating each of the scenes Sn in the virtual 3D space about the axis passing through the point An, the rotation being through an angle −8n, where 8n is the predetermined angle δn for at least one n, the rotation of Sn in the virtual 3D space being clockwise when viewed from a point along the axis passing through the point An viewed towards the x-z plane;

obtaining the right 2D image of the virtual space on the 2D viewing surface by the perspective projection determined by the viewing surface and the viewing ray; and displaying the left 2D image on the left display surface and displaying the right 2D image on the right display surface.

13. The system according to claim 12 further comprising one or more sensors configured to obtain time dependent data on a real-world environment around the user.

14. The system according to claim 13 wherein the one or more sensors includes a gravitational field detector, the gravitational sensor generating a time-dependent data signal that is indicative of an angle cp between a direction of the gravitational field and the up vector of the display unit, the signal being input to the processor.

15. The system according to claim 12 wherein each of the scenes S1, . . . Sn, . . . SN has a second associated predetermined point of rotation Bn, and the processor is further configured to rotate each scene about an axis of rotation passing through the point Bn parallel to the z axis, through an angle −cp, wherein cp is the angle between an up-vector and a gravitational field.

16. The system according to claim 12 wherein at least one of the scenes Sn is a plane bound scene having a base plane and the axis $a_0$, is perpendicular to the base plane.

17. The system according to claim 12 wherein the display unit is in the form of a pair of goggles, glasses or headset to be worn over a user's eyes.

18. The system according to claim 12 wherein one or more of the display devices comprises a transparent or translucent surface upon which images are projected.

19. The system according to claim 12 wherein the one or more of the sensors include one or more video cameras that obtain images of a real-world environment of the user.

20. The system according to claim 19 wherein the processor is further configured to integrate the stereo pair of images with real-world images of the user's environment.

21. The system according to claim 19 wherein the value of any one or more of the δn, An or Bn depend on data input to the processor from any one of the sensors.

* * * * *